(12) United States Patent
Kondo et al.

(10) Patent No.: US 10,128,482 B2
(45) Date of Patent: Nov. 13, 2018

(54) SEPARATOR FOR NON-AQUEOUS ELECTROLYTE SECONDARY BATTERY AND MANUFACTURING METHOD THEREOF

(71) Applicant: TOYOTA JIDOSHA KABUSHIKI KAISHA, Toyota-shi, Aichi-ken (JP)

(72) Inventors: Shinpei Kondo, Nagoya (JP); Yutaka Oyama, Toyota (JP); Akihiro Ochiai, Nissin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 174 days.

(21) Appl. No.: 15/095,592

(22) Filed: Apr. 11, 2016

(65) Prior Publication Data

US 2016/0308185 A1   Oct. 20, 2016

(30) Foreign Application Priority Data

Apr. 14, 2015   (JP) .................................. 2015-082403

(51) Int. Cl.
| | |
|---|---|
| *H01M 2/16* | (2006.01) |
| *H01M 2/14* | (2006.01) |
| *H01M 10/42* | (2006.01) |
| *H01M 10/05* | (2010.01) |

(52) U.S. Cl.
CPC ......... *H01M 2/1686* (2013.01); *H01M 2/145* (2013.01); *H01M 2/1653* (2013.01); *H01M 10/4235* (2013.01); *H01M 10/05* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2008/0070107 A1 | 3/2008 | Kasamatsu et al. | |
| 2011/0143183 A1* | 6/2011 | Matsumoto | H01M 2/1626 429/144 |
| 2018/0062141 A1* | 3/2018 | Sakamoto | B32B 5/22 |

FOREIGN PATENT DOCUMENTS

| | | |
|---|---|---|
| JP | 2003-208890 A | 7/2003 |
| JP | 2011-134564 A | 7/2011 |
| JP | 2012-28006 A | 2/2012 |
| JP | 2012190547 A | 10/2012 |
| JP | 2013-206743 A | 10/2013 |
| JP | 2013206605 A | 10/2013 |
| WO | 2006/061936 A1 | 6/2006 |
| WO | 2010/104127 A1 | 9/2010 |

* cited by examiner

*Primary Examiner* — Scott J. Chmielecki
(74) *Attorney, Agent, or Firm* — Sughrue Mion, PLLC

(57) ABSTRACT

A separator includes a substrate layer made of a resin and a heat resistance layer. The heat resistance layer contains heat-resistant fine particles and a binder. An amount of the binder contained per unit volume in the heat resistance layer positioned at an end portion in a width direction perpendicular to a longitudinal direction of the separator is higher than the amount of the binder contained per unit volume in the heat resistance layer (84) positioned at a center portion which includes the center in the width direction of the separator. In the heat resistance layer at the end portion, the amount of the binder contained per unit volume in a substrate layer side region is higher than the amount of the binder contained per unit volume in a surface region which includes a surface of the heat resistance layer.

7 Claims, 4 Drawing Sheets

SEPARATOR FOR NON-AQUEOUS ELECTROLYTE SECONDARY BATTERY AND MANUFACTURING METHOD THEREOF

INCORPORATION BY REFERENCE

The disclosure of Japanese Patent Application No. 2015-082403 filed on Apr. 14, 2015 including the specification, drawings and abstract is incorporated herein by reference in its entirety.

BACKGROUND OF THE INVENTION

1. Field of the Invention

The invention relates to a separator for a non-aqueous electrolyte secondary battery, and a manufacturing method thereof.

2. Description of Related Art

A non-aqueous electrolyte secondary battery such as a lithium-ion secondary battery (lithium secondary battery) is lightweight and has high energy density compared to existing batteries, and has been used as a so-called portable power source for a personal computer (PC), a portable terminal, or the like, or a power source for driving a vehicle in recent years. Particularly, a lithium-ion secondary battery which achieves high energy density with a low weight is preferably used as a high-output power source for driving a vehicle such as an electric vehicle (EV), a hybrid vehicle (HV), or a plug-in hybrid vehicle (PHV). This type of secondary battery is typically constructed by accommodating an electrode body formed by laminating a positive electrode and a negative electrode with a separator interposed therebetween, in a case along with an electrolyte.

As the separator, a porous film made of a resin is typically used. The separator has a function of electrically insulating the positive and negative electrodes from each other, a function of holding a non-aqueous electrolyte, and a shutdown function (that is, a function of blocking a conducting path of charge carriers by softening when the inside of the battery is overheated and reaches a predetermined temperature range (typically the softening point of the separator)). Moreover, in addition to the above-described functions, the separator is required to have a role of preventing short-circuits caused by contact between the positive and negative electrodes (short-circuit prevention function) for the purpose of ensuring the safety of the battery and the device in which the battery is mounted. For example, when the inside of the battery is overheated to the softening point of the resin forming the separator or higher and the separator shrinks due to the heat, there is concern that a short-circuit may be generated due to an insufficient coating area of the separator over the electrodes, the breakage of the separator, or the like. Therefore, the separator is required to have performance in which an internal short-circuit is prevented by suppressing the shrinkage of the separator even in an environment at a high temperature, that is, a predetermined level of heat resistance (durability). As a method to meet the requirements, a configuration in which a porous heat resistance layer (HRL) is provided on the surface of a separator made of a resin is proposed. For example, in International Patent Publication No. WO2010/104127, a separator, in which a heat resistance layer primarily containing inorganic filler is provided on a substrate layer made of a resin and the peel strength between the substrate layer and the heat resistance layer is set to a predetermined strength or higher, and a battery provided with the separator, are described.

However, for example, in a case where the battery is exposed to harsher conditions (for example, exposure to an environment at a higher temperature, or exposure to an environment at a high temperature for a long period of time), the energy that causes the substrate layer to shrink becomes excessive, and there may be cases where the heat resistance layer peels off from the substrate layer. That is, although the heat resistance of the separator can be enhanced by forming the heat resistance layer on the surface of the substrate layer, when the heat resistance layer peels off from the substrate layer, it becomes difficult to suppress the shrinkage (thermal shrinkage) of the separator at a position where the heat resistance layer peels off, and there may be cases where the function of preventing short-circuits is not sufficiently exhibited.

SUMMARY OF THE INVENTION

The invention provides a separator which has a substrate layer and a heat resistance layer, and is prevented from shrinking due to heat in an environment at a high temperature.

As a method to prevent the heat resistance layer from peeling off from the substrate layer, increasing the peel strength of the heat resistance layer on the substrate layer is considered. The inventors found that increasing the peel strength between the substrate layer and the heat resistance layer at an end portion in a long separator particularly in a width direction perpendicular to a longitudinal direction thereof is effective for suppressing thermal shrinkage of the separator, and completed the invention.

A first aspect of the invention relates to a separator for a non-aqueous electrolyte secondary battery, including: a substrate layer made of a resin; and a heat resistance layer provided on one surface of the substrate layer, the separator having a long sheet shape. Here, in the separator, the heat resistance layer contains heat-resistant fine particles and a binder, an amount of the binder contained per unit volume in the heat resistance layer positioned at an end portion in a width direction perpendicular to a longitudinal direction of the separator is higher than the amount of the binder contained per unit volume in the heat resistance layer positioned at a center portion which includes the center in the width direction of the separator, and in the heat resistance layer at the end portion, the amount of the binder contained per unit volume in a substrate layer side region is higher than the amount of the binder contained per unit volume in a surface side region which includes a surface of the heat resistance layer.

By increasing the amount of the binder in the heat resistance layer, the peel strength between the substrate layer and the heat resistance layer can be increased. Particularly, increasing the amount of the binder in a region of the heat resistance layer, which is close to the substrate layer, is effective in increasing the peel strength. That is, in the above-described configuration, the peel strength between the substrate layer and the heat resistance layer at the end portion in the width direction perpendicular to the longitudinal direction of the separator can be increased. Accordingly, thermal shrinkage of the separator can be suppressed. On the other hand, a portion of the heat resistance layer with a high amount of the binder per unit volume tends to allow charge carriers (typically lithium ions) to be less likely to move (diffuse). The non-aqueous electrolyte secondary battery is typically charged and discharged as the charge carriers (for example, lithium ions) move between a positive electrode active material layer and a negative electrode active material layer. Since the center portion in the width direction of the separator is typically positioned to be interposed between the positive electrode active material layer and the negative electrode active material layer, when the penetration of the charge carriers at the center portion of the heat resistance layer is degraded, there is concern of an increase in the battery resistance of the battery constructed by using the separator. Therefore, according to the above-described configuration, by reducing the amount of the binder contained in the heat resistance layer positioned at the center portion in the width direction of the separator to be lower than the amount of the binder contained in the heat resistance layer positioned at the end portion in the width direction of the separator, the penetration of the charge carriers at the center portion in the width direction of the separator can be further ensured in contrast to a case of increasing the peel strength of the entire heat resistance layer on the substrate layer by increasing the amount of the binder in the entire heat resistance layer. Accordingly, the battery resistance of the battery constructed by using the separator can be reduced.

Here, in the specification, the concentration of the binder in the heat resistance layer, that is, the amount (vol %) of the binder contained per unit volume in the heat resistance layer is obtained as follows. First, a cross-section of the separator, which is a measurement object, is exposed through processing using a cross-section polisher or the like. For example, in a case of using a binder having a carbon-carbon double bond, such as SBR, the binder in the heat resistance layer is dyed with bromine (Br) or osmium (Os) to dye a portion having a carbon-carbon double bond, and thereafter, the position and amount of Br atoms or Os atoms may be confirmed using general scanning electron microscope (SEM)-energy dispersive X-ray spectroscopy (EDX) or an electron probe micro analyzer (EPMA), thereby allowing determination the amount and position of the binder in the heat resistance layer. In addition, in a case of using a binder containing fluorine atoms, such as PVDF, Kα radiation of fluorine may be measured through analysis using SEM-EDX or EPMA, or through X-ray photoelectron spectroscopy (XPS), thereby directly measuring the amount and position of the binder in the heat resistance layer. In this manner, the distribution pattern, amount, and position of the binder in the heat resistance layer can be specified.

A peel strength between the substrate layer and the heat resistance layer at the end portion may be 20 N/m or higher and 50 N/m or lower. By allowing the peel strength between the substrate layer and the heat resistance layer at the end portion to be in the above range, peeling of the heat resistance layer from the substrate layer can be suppressed to a high degree.

The peel strength mentioned in the specification is a 90-degree peel strength measured according to JIS C 6481 (1996). A typical method of measuring and testing the peel strength (90-degree peel strength) is described below. Specifically, the separator is cut into a predetermined size to prepare a rectangular test piece. In order to fix the substrate layer of one end portion in the long side direction of the test piece to a tension jig (for example, clamp), the heat resistance layer of one end portion in the long side direction of the test piece is peeled off from the substrate layer. The heat resistance layer surface of the test piece is fixed onto the fixture of a tensile tester using an adhesive such as a double-sided tape, and the peeled portion (the substrate layer) of the heat resistance layer of the test piece is fixed to the tension jig. In addition, the tension jig is pulled upward (at a peel angle of 90±5°) in the vertical direction with respect to the surface of the fixture (that is, the heat resistance layer attached to the fixture) at a predetermined speed (for example, 0.5 mm per second) to peel the heat resistance layer and the substrate layer from each other. At this time, the average of loads while the substrate layer is peeled off from the heat resistance layer is measured, and the average of loads per unit width is referred to as peel strength (N/mm).

A length in the width direction of the end portion may be 1.5% or more and 10% or less of a length in the width direction of the separator for each end portion in the width direction. At the end portion in the width direction perpendicular to the longitudinal direction of the separator, by allowing the length in the width direction perpendicular to the longitudinal direction of the end portion to be in the above range, thermal shrinkage of the separator can be suppressed to a high degree. When the length in the width direction of the end portion is too small, the energy that causes the substrate layer to shrink cannot be suppressed, and there is concern that the heat resistance layer may peel off from the substrate layer at the end portion. On the other hand, when the length in the width direction of the end portion is too large, there is concern that ion permeability of the heat resistance layer may decrease, and there may be a case where the battery resistance of the battery constructed by using the separator is increased.

A second aspect of the invention relates to a non-aqueous electrolyte secondary battery including: an electrode body which includes a positive electrode and a negative electrode laminated with the separator according to the first aspect interposed therebetween; and a non-aqueous electrolyte. The separator is a separator with suppressed thermal shrinkage. Therefore, by constructing the non-aqueous electrolyte secondary battery using the separator, a non-aqueous electrolyte secondary battery with a reduced frequency of internal short-circuits and high stability can be manufactured. In addition, a non-aqueous electrolyte secondary battery in which an increase in the resistance is reduced can be manufactured.

In the specification, the "non-aqueous electrolyte secondary battery" refers to a secondary battery provided with a non-aqueous electrolyte (typically, a non-aqueous electrolytic solution containing a support salt (support electrolyte)) in a non-aqueous solvent (organic solvent)). Here, the "secondary battery" refers to a general battery which can be repeatedly charged and discharged, and is a term including a chemical battery such as a lithium-ion secondary battery and a physical battery including an electric double-layer capacitor.

A third aspect of the invention relates to a manufacturing method of a separator for a non-aqueous electrolyte secondary battery, the separator including a substrate layer made of a resin and a heat resistance layer formed on a surface of the substrate layer and having a long sheet shape. The manufacturing method of the separator includes the following processes: (1) applying a heat resistance layer formation composition containing heat-resistant fine particles, a binder, and a solvent onto the substrate layer; and (ii) heating the heat resistance layer formation composition applied to an end portion in a width direction perpendicular to a longitudinal direction of the substrate layer in the heat resistance layer formation composition applied onto the substrate layer, from a substrate layer side, thereby forming the heat resistance layer, in which an amount of the binder contained per unit volume in a substrate layer side region is higher than the amount of the binder contained per unit volume in a surface side region which includes a surface of the heat resistance layer, at the end portion in the width direction of the heat resistance layer.

When the heat resistance layer formation composition applied to the substrate layer is locally heated and thus a temperature difference occurs between the heated portion and a non-heated portion, convection in a direction from a portion with a relatively low temperature toward a portion with a relatively high temperature occurs in the heat resistance layer formation composition due to the temperature difference. The binder in the heat resistance layer formation composition moves (migrates) in the heat resistance layer formation composition along the convection, such that the concentration of the binder in the portion with a relatively high temperature increases. In addition, regarding the solvent in the heat resistance layer formation composition, the portion with a relatively high temperature vaporizes first. Therefore, by locally heating the heat resistance layer formation composition applied onto the substrate layer, a separator in which the amount of the binder contained per unit volume in the portion at a temperature increased due to the heating is high can be produced. In the heat resistance layer formation composition applied onto the substrate layer, by heating the heat resistance layer formation composition on the end portion in the width direction perpendicular to the longitudinal direction of the substrate layer, the amount of the binder in the heat resistance layer positioned at the end portion in the width direction perpendicular to the longitudinal direction of the separator can be increased. Particularly, by performing the local heating of the heat resistance layer formation composition from the substrate layer side, the amount of the binder in a region of the heat resistance layer (end portion perpendicular to the longitudinal direction of the heat resistance layer) positioned at the end portion in the width direction of the separator, which is close to the substrate layer, can be increased. Accordingly, the peel strength between the substrate layer and the heat resistance layer at the end portion in the width direction of the heat resistance layer can be increased.

In the heating process, the end portion in the width direction of the heat resistance layer may be heated at a temperature of 80° C. or higher. By allowing the heating temperature of the end portion in the width direction of the heat resistance layer to be 80° C. or higher, convection caused by the temperature difference between the heated portion and the non-heated portion in the heat resistance layer formation composition can appropriately occur. Accordingly, the binder in the heat resistance layer formation composition can smoothly move due to the temperature difference.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Items which are not items that are particularly mentioned in the invention and are necessary items for the implementation of the invention can be recognized as design items by those skilled in the related art in the corresponding field. The invention can be implemented on the basis of the contents disclosed in the specification and general technical knowledge in the corresponding field. In the following drawings, like members or portions having the same function are denoted by like reference numerals, and overlapping description will be omitted or simplified. In each of the drawings, the dimensional relationships (length, width, thickness, and the like) do not necessarily reflect actual dimensional relationships.

Hereinafter, a separator according to an embodiment of the invention will be described with reference to the appropriate drawings. The invention is not intended to be limited by the embodiment, and for example, the shape (external form or size) of the separator is not particularly limited.

Figure 1:
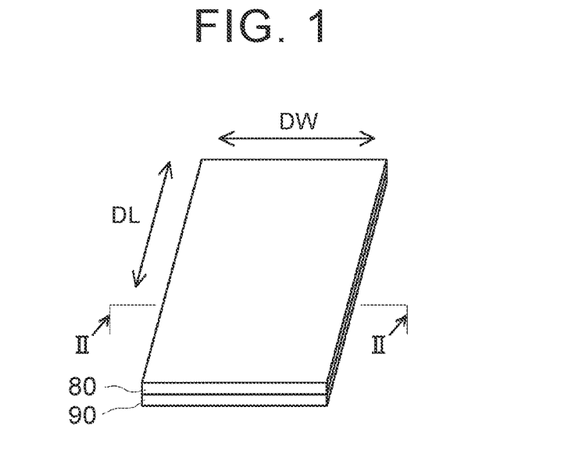
FIG. 1 is a perspective view illustrating the configuration of a separator according to an embodiment of the invention.
Figure 2:
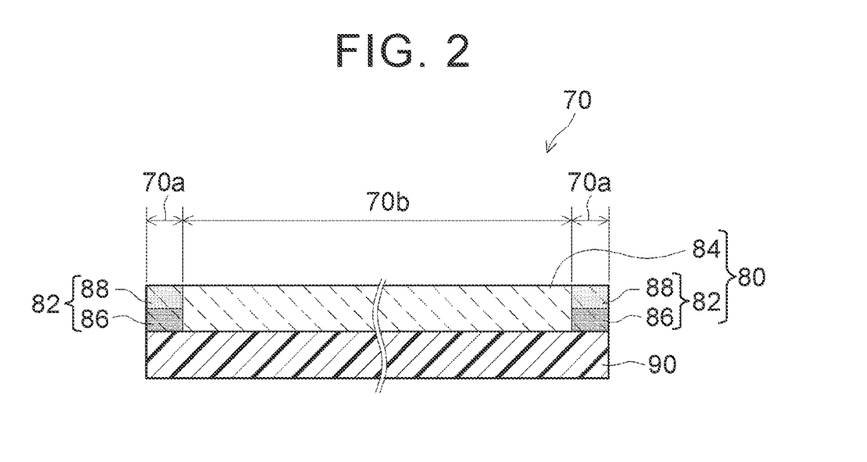
FIG. 2 is a view illustrating a sectional structure taken along line II-II of FIG. 1.

The separator for a non-aqueous electrolyte secondary battery in this embodiment may have the same configuration as that in the related art except that a heat resistance layer (HRL) of this embodiment is included. As illustrated in FIGS. 1 and 2, a is a long sheet-shaped separator which includes a substrate layer 90 formed of a porous separator substrate, and a heat resistance layer 80 formed on one surface (single surface) of the substrate layer 90. Typically, the heat resistance layer 80 may be formed over the entire surface of the substrate layer 90, that is, over the entire substrate layer 90 in a longitudinal direction DL and a width direction DW thereof. The separator 70 having the above configuration has a function of insulating a positive electrode (positive electrode active material layer) and a negative electrode (negative electrode active material layer), a function of holding an electrolyte, and a shutdown function. Hereinafter, the substrate layer (separator substrate) 90 and the heat resistance layer 80 will be described in detail.

As the separator substrate forming the substrate layer 90, a long sheet-shaped resin substrate as used in a non-aqueous electrolyte secondary battery of the related art may be used. Appropriate examples thereof include porous resin sheets (film) which are formed by primarily containing a thermoplastic resin such as polyethylene (PE), polypropylene (PP), polyester, cellulose, and polyamide. Among the sheets, a porous resin sheet which is formed by primarily containing a polyolefin-based resin (for example, PE or PP) has a shutdown temperature of 80° C. to 140° C. (typically 110° C. to 140° C., for example, 120° C. to 135° C.), which is sufficiently lower than the heat-resistant temperature of the battery (typically approximately 200° C. or higher), and thus can exhibit the shutdown function at an appropriate timing. Therefore, the battery with higher reliability can be realized.

The substrate layer 90 may have a single-layer structure, or may have a structure in which two or more porous resin sheets having different materials and properties (thickness, porosity, and the like) are laminated. For example, as a sheet having a PE single layer, a sheet having a PP single layer, and a sheet having a multi-layer structure, for example, a sheet having a two-layer structure in which a PE layer and a PP layer are laminated (PE/PP structure), or a three-layer structure in which PP layers are laminated on both sides of a PE layer (PP/PE/PP structure) may be appropriately used.

The thickness (average thickness) of the substrate layer 90 is not particularly limited, and is typically 5 μm or greater (typically 10 μm or greater, for example, 12 μm or greater) and 40 μm or smaller (typically 30 μm or smaller, for example, 25 μm or smaller). Since the thickness of the substrate layer 90 is in the above range, the insulating function or the function of holding the electrolyte described above can be appropriately exhibited, and ion permeability can be more properly maintained. Therefore, more excellent battery performance can be realized. In addition, the thickness of the substrate layer 90 can be obtained through measurement using a micrometer, a thickness gauge, or the like, or through analysis using a cross-sectional SEM image.

The heat resistance layer 80 has a property of retaining its shape (slight deformation may be allowed) without softening or melting even in a case where the inside of the battery reaches a high temperature (for example, 150° C. or higher, and typically 200° C. or higher), for example, due to an internal short-circuit. The heat resistance layer 80 contains heat-resistant fine particles and a binder.

The heat-resistant fine particles contained in the heat resistance layer 80 may be fine particles that can be typically used as filler in the heat resistance layer of a separator for a non-aqueous electrolyte secondary battery. The filler may be any of organic filler, inorganic filler, and a combination of organic filler and inorganic filler. However, in consideration of heat resistance, durability, dispersibility, stability, and the like, the inorganic filler is preferably used.

The inorganic filler is not particularly limited, and examples thereof include metal oxides and metal hydroxides. Specific examples thereof include: inorganic oxides such as alumina (aluminum oxide: $Al_2O_3$), boehmite ($Al_2O_3 \cdot H_2O$), silica (silicon oxide: $SiO_2$), titania (titanium oxide: $TiO_2$), zirconia (zirconium dioxide: $ZrO_2$), calcia (calcium oxide: CaO), magnesia (magnesium oxide: MgO), barium titanate ($BaTiO_3$), and iron oxide; inorganic nitrides such as silicon nitride ($Si_3N_4$) and aluminum nitride (AlN); element-based materials such as silicon, aluminum, and iron; and mineral based materials such as talc, clay, mica, bentonite, montmorillonite, zeolite, apatite, kaolin, mullite, and sericite. Among these materials, one type may be singly used, or a combination of two or more types may be used. Among these materials, alumina, boehmite, silica, titania, zirconia, calcia, and magnesia are preferable, and alumina, boehmite, titania, silica, and magnesia are particularly preferable. These compounds have high melting points and excellent heat resistance. In addition, the compounds have relatively high Mohs hardness and excellent durability (mechanical strength). Furthermore, since the compounds are relatively cheap, raw material costs can be reduced. Particularly, aluminum has a relatively low specific gravity among metals and can realize a reduction in the weight of the battery.

As the organic filler, for example, highly heat-resistant resin particles made of aramid, polyimide, polyamide-imide, polyethersulfone, polyetherimide, polycarbonate, polyacetal, polyether ether ketone, polyphenylene ether, and polyphenylene sulfide may be used.

In a case where the inorganic filler and the organic filler are used in combination, the mixing ratio therebetween (inorganic filler:organic filler) is not particularly limited, and is preferably 10:90 to 90:10 (typically 20:80 to 70:30, for example, 30:70 to 60:40) in terms of mass.

The form of the filler is not particularly limited, and for example, the filler may be in the form of particles, fibers, or a plate (flakes). In addition, the average particle size of the filler is not particularly limited, and in consideration of dispersibility and the like, is appropriately 0.01 μm or greater (for example, 0.05 μm or greater, and typically 0.1 μm) and 5 μm or smaller (for example, 3 μm or smaller, and typically 2 μm or smaller). By allowing the particle size of the filler to be in the above range, the peel strength of the heat resistance layer 80 on the substrate layer 90 can be adjusted to be in an appropriate range. In the specification, the "average particle size" of the filler refers to a particle size (also referred to as $D_{50}$ particle size, or median diameter), corresponding to a cumulative 50 vol % from a small particle size side in a volume-based particle size distribution measured through measurement of particle size distributions based on a general laser diffraction/light scattering method. The particle size of the inorganic filler can be adjusted, for example, by a method such as pulverizing or sifting.

The specific surface area of the filler is not particularly limited, and it is preferable that the specific surface area thereof is approximately 1 $m^2/g$ or higher (for example, 1.5 $m^2/g$ or higher, and typically 5 $m^2/g$ or higher) and 100 $m^2/g$ or lower (for example, 50 $m^2/g$ or lower, and typically 20 $m^2/g$ or lower). By allowing the specific surface area of the filler to be in the above range, the peel strength of the heat resistance layer 80 on the substrate layer 90 can be adjusted to be in an appropriate range. Here, as the "specific surface area", a general BET specific surface area is employed.

Examples of the binder contained in the heat resistance layer 80 include: acrylic resins obtained through polymerization of monomer components primarily containing alkyl (meth)acrylates (preferably, alkyl (meth)acrylates having an alkyl group with 1 to 14 (typically 2 to 10) carbon atoms) such as methyl acrylate, methyl methacrylate, ethyl acrylate, ethyl methacrylate, butyl acrylate, and 2-ethylhexyl acrylate; polyolefin-based resins such as polyethylene (PE); fluorine-based resins such as polytetrafluoroethylene (PTFE); vinyl halide resins such as polyvinylidene fluoride (PVdF); cellulose-based resins such as carboxymethyl cellulose (CMC) and methyl cellulose (MC); rubbers containing acrylonitrile as copolymerization components, such as acrylonitrile-butadiene copolymer rubber (NBR), acrylonitrile-isoprene copolymer rubber (NIR), and acrylonitrile-butadiene-isoprene copolymer rubber (NBIR); polyvinylpyrrolidone (PVP)-based resins; polyvinylacetamide (PNVA)-based resins; epoxy resins; and styrene-butadiene rubber (SBR). Only one type or two or more types may be appropriately selected therefrom to be used as the binder. Among the materials, acrylic resins have strong adhesion (typically initial tackiness and adhesion strength) and electrochemical stability, exhibits high shape retainability, and is thus preferable. The peel strength of the heat resistance layer 80 on the substrate layer 90 can be controlled to be in a desired range by appropriately selecting the types of the binder used for the formation of the heat resistance layer 80 and the combination thereof.

The monomer components used for the polymerization of the acrylic resins may contain well-known monomers including: vinyl monomers containing a carboxyl group such as acrylic acid or methacrylic acid; amide group-containing vinyl monomers such as acrylamide and methacrylamide; and hydroxyl group-containing vinyl monomers such as 2-hydroxyethyl acrylate and 2-hydroxyethyl methacrylate. The mixing ratio of these monomers is not particularly limited, and may be less than 50 mass % (for example, 30 mass % or less, and typically 10 mass % or less) of the total monomer components. The acrylic resin may be any of a homopolymer obtained through polymerization of one type of monomer, a copolymer obtained through polymerization of two or more types of monomers, and a mixture of two or more types of the homopolymer and the copolymer. Otherwise, the acrylic resin may be a modified acrylic resin in which a portion is modified.

The heat resistance layer 80 may contain, in addition to the above-described filler and the binder, one type or two or more types of materials that can be used as constituent components of the heat resistance layer in a general secondary battery as necessary. Examples of the materials include various additives such as thickeners and dispersants.

The ratio of the contained filler to the entirety of the heat resistance layer 80 is appropriately approximately 50 mass % or more. It is preferable that the ratio thereof is typically 80 mass % or more (for example, 85 mass % or more), and 99.8 mass % or less (for example, 99 mass % or less). The ratio of the contained binder to the entirety of the heat resistance layer 80 is, for example, approximately 0.2 mass % to 15 mass %, and it is preferable that the ratio thereof is typically approximately 0.5 mass % to 8 mass %. In a case of using various additives, the ratio of the additives to the entirety of the heat resistance layer 80 may be, for example, approximately 0.2 mass % to 10 mass %, and it is preferable that the ratio thereof is typically approximately 0.5 mass % to 5 mass %.

The mass ratio (in terms of NV, that is, in terms of solid content) between the filler and the binder contained in the heat resistance layer 80 is, in terms of filler:binder, for example, 90:10 to 99.8:0.2, preferably 93:7 to 99.5:0.5, and more preferably 93:7 to 99:1. By allowing the mass ratio between the filler and the binder to be in the above range, the peel strength of the heat resistance layer 80 on the substrate layer 90 can be controlled to be in a desired range. When the ratio of the binder to the filler is too low, the anchoring property of the heat resistance layer 80 or the strength (shape retainability) of the heat resistance layer itself is degraded, and problems such as cracking and peeling may occur. When the ratio of the binder to the filler is too high, there may be cases where the porosity of the heat resistance layer 80 is degraded or the ion permeability of the separator 70 is degraded. In a preferable aspect, the total amount of the filler and the binder contained in the entirety of the heat resistance layer 80 is approximately 90 mass % or more (for example, 95 mass % or more). The heat resistance layer may also be constituted substantially only by the filler and the binder.

As illustrated in FIG. 2, in the separator 70, the amount of the binder contained per unit volume in a heat resistance layer 82 (hereinafter, also referred to as "heat resistance layer end portion 82") positioned at an end portion 70a in the width direction DW perpendicular to the longitudinal direction DL of the separator 70 is higher than the amount of the binder contained per unit volume in a heat resistance layer 84 (hereinafter, also referred to as "heat resistance layer center portion 84") positioned at a center portion 70b that includes at least the center in the width direction DW of the separator 70. In addition, the amount of the binder contained per unit volume in a region 86 (hereinafter, also referred to as "substrate layer proximity region 86") in the proximity of the substrate layer 90 in the heat resistance layer end portion 82 is higher than the amount of the binder contained per unit volume in a surface region 88 (a region which is relatively closer to the surface than the substrate layer proximity region 86) including the surface of the heat resistance layer in the heat resistance layer end portion 82 (the substrate layer proximity region 86 is provided between the surface region 88 and the substrate layer 90). In other words, the amount of the binder per unit volume in the substrate layer proximity region 86 is higher than the amount of the binder per unit volume in the other regions (that is, the heat resistance layer center portion 84 and the surface region 88) of the heat resistance layer 80 excluding the substrate layer proximity region 86. In addition, a region in which the amount of the binder is locally high has a tendency toward a reduction in the penetration of charge carriers (for example, lithium ions), and it is preferable that a portion in which the amount of the binder is locally high in a thickness direction of the heat resistance layer 84 is not present in the heat resistance layer center portion 84. Specifically, it is preferable that in the heat resistance layer center portion 84, the difference between the amount of the binder contained in a region which includes the surface and is relatively close to the surface and the amount of the binder contained in a region (substrate layer side region) which is relatively close to the substrate layer 90 is small, and it is more preferable that there is no difference in the amount of the binder.

Here, at the end portion 70a in the width direction DW of the separator, the length in the width direction DW of the end portion 70a may be specified to be in a range of, for each end portion in the width direction, 1.5% or more (preferably 1.6% or more) of the length of the entirety of the separator 70 (that is, the heat resistance layer 80) in the width direction, and 10% or less (preferably 8.4% or less) thereof. In the specification, the "length in the width direction" refers to a length in the width direction DW perpendicular to the longitudinal direction DL if not particularly mentioned. For example, when the separator 70 has a length of 120 mm in the width direction DW perpendicular to the longitudinal direction DL, regarding the end portion 70a in the width direction DW of the separator 70, the length of the end portion 70a in the width direction may be specified to be in a range of, for each end portion 70a in the width direction, 2 mm or greater (preferably 3 mm or greater, and more preferably 5 mm or greater), and 11 mm or smaller (preferably 10 mm or smaller). From the viewpoint of the suppression of an increase in battery resistance when the battery is constructed, it is preferable that the length of the end portion 70a in the width direction is specified so that the end portion 70a in the width direction of the separator does not overlap a facing region in which the positive and negative electrode active material layers face each other.

In the separator 70, the peel strength (90-degree peel strength) between the substrate layer 90 and the heat resistance layer 80 (the heat resistance layer end portion 82) at the end portion 70a in the width direction DW perpendicular to the longitudinal direction DL of the separator 70 is higher than the peel strength between the substrate layer 90 and the heat resistance layer 80 (84) at the center portion 70b including the center in the width direction DW of the separator 70. The peel strength between the substrate layer 90 and the heat resistance layer 80 (the heat resistance layer end portion 82) at the end portion 70a is preferably 15 N/m or higher, and more preferably 20 N/m or higher. The upper limit of the peel strength between the substrate layer 90 and the heat resistance layer 80 (the heat resistance layer end portion 82) at the end portion 70a is not particularly limited, and may be, for example, 50 N/m or lower. By allowing the peel strength between the substrate layer 90 and the heat resistance layer 80 (the heat resistance layer end portion 82) at the end portion 70a to be in the above range, peeling of the heat resistance layer 80 (the heat resistance layer end portion 82) from the substrate layer 90 at the end portion 70a can be suppressed. Particularly, at a high temperature at which the substrate layer 90 may shrink due to heat, peeling of the heat resistance layer 80 from the substrate layer 90 can be suppressed by a high level. Therefore, by allowing the peel strength between the substrate layer 90 and the heat resistance layer 80 (the heat resistance layer end portion 82) at the end portion 70a in the width direction DW of the separator 70 to be in the above range, thermal shrinkage of the separator can be suppressed. In addition, the peel strength at the center portion 70b including the center in the width direction DW of the separator 70 is not particularly limited, and may be, for example, 1.5 N/m or higher and 15 N/m or lower. By allowing the peel strength between the substrate layer 90 and the heat resistance layer 80 (84) at the center portion 70b to be in the above range, peeling of the heat resistance layer 80 (84) from the substrate layer 90 at the center portion 70b can be suppressed.

The thickness (average thickness) of the heat resistance layer 80 is not particularly limited, and it is preferable that the thickness thereof is, in a dry state, typically 1 μm or greater, for example, 1.5 μm or greater (typically 2 μm or greater, and preferably 5 μm or greater). When the thickness of the heat resistance layer 80 is too small, there may be cases where a heat-resistant effect cannot be sufficiently exhibited, and a short-circuit prevention effect is reduced. On the other hand, when a battery is constructed by using a separator in which the thickness of the heat resistance layer 80 is too great, the volume occupied by the separator (heat resistance layer) in the battery becomes excessive, and there may be a case where the battery capacity decreases. Therefore, the upper limit of the thickness of the heat resistance layer 80 is not particularly limited, and it is preferable that the upper limit thereof is, in a dry state, typically 20 μm or smaller, for example, 10 μm or smaller (typically 8 μm or smaller). The thickness of the heat resistance layer 80 can be obtained, for example, by analyzing an image taken by using a scanning electron microscope (SEM).

Hereinafter, a manufacturing method of the separator according to the invention will be exemplified by preferred embodiments, in which the separator having the above-described configuration is manufactured, with reference to the appropriate drawings. The manufacturing method of the separator of the invention is not intended to be limited to the following embodiment.

Figure 3:
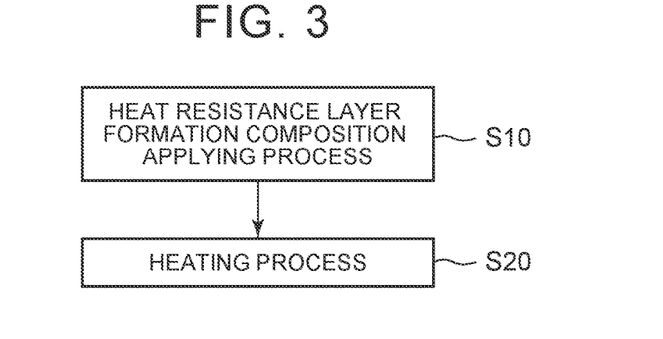
FIG. 3 is a flowchart illustrating a manufacturing method of the separator of the embodiment.

As illustrated in FIG. 3, the manufacturing method of the separator of this embodiment includes a heat resistance layer formation composition applying process (S10), and a heating process (S20). Hereinafter, each process will be described in detail.

First, the heat resistance layer formation composition applying process (S10) will be described. The process includes preparing a heat resistance layer formation composition containing heat-resistant fine particles, a binder, and a solvent and applying the heat resistance layer formation composition onto the separator substrate (substrate layer) 90.

The heat resistance layer formation composition may be typically a slurry-like (paste-like or ink-like) composition. The heat resistance layer formation composition may be prepared by dispersing the heat-resistant fine particles, the binder, and materials used as necessary (for example, CMC as a thickener) in the solvent. Here, as the dispersion method, well-known methods, such as mixing using a well-known mixing device (disperser), may be employed without particular limitations. The dispersion method does not characterize the invention, and thus detailed description thereof will be omitted.

As the heat-resistant fine particles, the binder, and the separator substrate, those that can be used in a separator for a non-aqueous electrolyte secondary battery of the related art may be employed without limitations, and for example, the above-described materials may be used.

Here, the form of the binder is not particularly limited, and a binder in the form of particles (powder) may be used as it is. Otherwise, a binder prepared to be in the form of a solution or emulsion may be used. Two or more types of binders with different forms may also be used. In a case where the binder in the form of particles is used, a binder having an average particle size of 50 nm or greater (preferably 100 nm or greater, and more preferably 200 nm or greater) and 500 nm or smaller (preferably 400 nm or smaller) may be appropriately used. The binder having such an average particle size easily moves (migrates) in the heat resistance layer formation composition, is likely to increase the amount of the binder in the heat resistance layer formation composition 82a (shown in FIG. 4) positioned at the end portion in the width direction DW perpendicular to the longitudinal direction DL of the substrate layer 90 during the heating process, which will be described later, and is thus preferable.

The solvent is not particularly limited, and any of an aqueous solvent and a non-aqueous solvent may be used. Appropriate examples of the non-aqueous solvent include organic solvents such as N-methyl-2-pyrrolidone (NMP), pyrrolidone, methyl ethyl ketone, methyl isobutyl ketone, cyclohexanone, toluene, dimethyl carbonate (DMC), ethyl methyl carbonate (EMC), dimethylformamide, and dimethylacetamide, and a combination of two or more types thereof. Otherwise, water or a solvent mixture primarily containing water may also be used. As the solvent other than water contained in the solvent mixture, one type or two or more types of organic solvents (lower alcohols, lower ketones, and the like) that can be homogeneously mixed with water may be appropriately selected to be used. Among the materials, a binder with excellent dispersibility for the binder to be used, or a solvent in which the binder can be dissolved are preferable because the binder easily moves (migrate) in the heat resistance layer formation composition (80a in FIG. 4) applied onto the substrate layer 90 during the heating process, which will be described later.

The ratio of the solid content (solid content concentration) of the heat resistance layer formation composition is not particularly limited, and may be approximately 30 mass % or more (preferably 40 mass % or more) and 70 mass % or less (preferably 60 mass % or less). For example, the ratio thereof may be adjusted to approximately about 50 mass %. By adjusting the ratio of the solid content (solid content concentration) of the heat resistance layer formation composition to be in the above range, during the heating process, which will be described later, the binder easily moves (migrates) in the heat resistance layer formation composition (80a in FIG. 4) applied to the substrate layer 90, which is preferable. In addition, the heat resistance layer formation composition in which the ratio of the solid content of the heat resistance layer formation composition is in the above range has excellent operability when the heat resistance layer formation composition is applied onto the substrate layer 90, which is preferable.

In addition, an appropriate amount of the heat resistance layer formation composition prepared as described above is applied to the surface (one surface) of the separator substrate (substrate layer) 90. A method of applying the heat resistance layer formation composition to the substrate layer 90 is not particularly limited, and for example, by using an appropriate device such as a die coater, gravure roll coater, reverse roll coater, kiss roll coater, dip roll coater, bar coater, air knife coater, spray coater, brush coater, or screen coater, the heat resistance layer formation composition 82*a* (shown in FIG. 4) may be applied onto the substrate layer 90.

Figure 4:
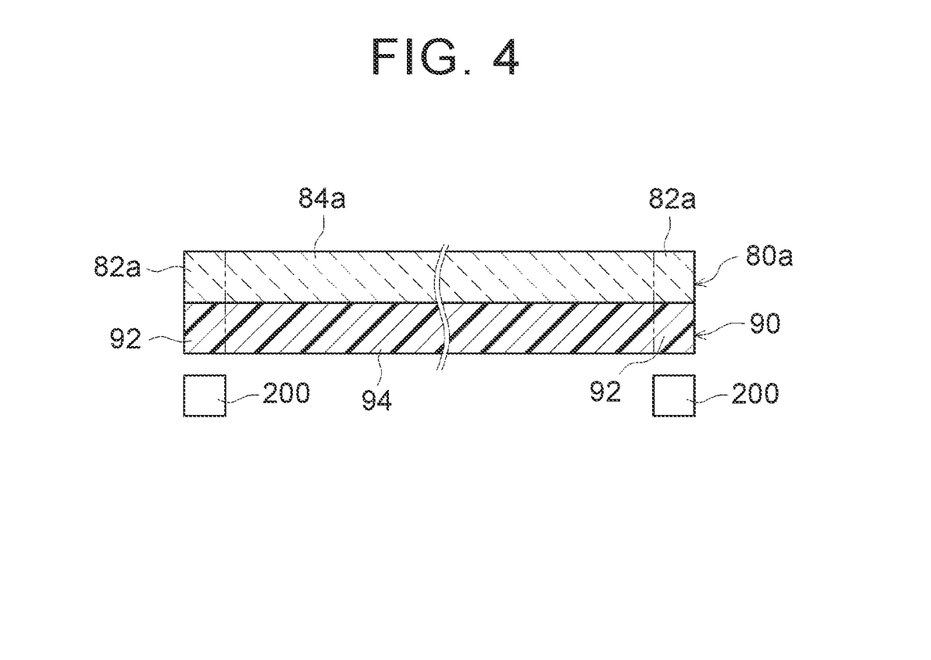
FIG. 4 is a view illustrating an embodiment of a process of locally heating a heat resistance layer formation composition applied to an end portion in a width direction of a substrate layer in the manufacturing method of the separator of the embodiment.

Next, the heating process (S20) will be described. As illustrated in FIG. 4, the process includes heating, from the substrate layer side, the heat resistance layer formation composition (hereinafter, also referred to as "end portion composition 82*a*") applied onto an end portion 92 (hereinafter, also referred to as "substrate layer end portion 92") in the width direction DW perpendicular to the longitudinal direction DL of the substrate layer 90 in the heat resistance layer formation composition 80*a* applied to the substrate layer 90 during the heat resistance layer formation composition applying process (S10). Through the heating, the temperature of the heat resistance layer formation composition (end portion composition) 82*a* on the substrate layer end portion 92 can be higher than the temperature of the heat resistance layer formation composition (hereinafter, also referred to as "center portion composition 84*a*") on a center portion 94 (hereinafter, also referred to as "substrate layer center portion 94") in the width direction DW of the substrate layer 90. In addition, by performing the heating from the substrate layer side, the temperature of a region of the end portion composition 82*a*, which is relatively close to the substrate layer 90, can be higher than the temperature of the surface region which includes the surface of the heat resistance layer formation composition and is relatively close to the surface. When there is a temperature difference in the heat resistance layer formation composition 80*a* applied onto the substrate layer 90, due to the temperature difference, convection occurs in a direction from a region with a relatively low temperature toward a region with a relatively high temperature. The binder in the heat resistance layer formation composition 82*a* moves along the convection, such that the amount of the binder in the portion with a relatively high temperature is higher than the amount of the binder in the portion with a relatively low temperature. In addition, regarding the solvent in the heat resistance layer formation composition 80*a*, the solvent contained in the heat resistance layer formation composition in a region of the end portion composition 82*a*, which is at a relatively high temperature and is close to the substrate layer, vaporizes first. As a result, the concentration of the binder in the heat resistance layer formation composition (end portion composition) 82*a* applied to the substrate layer end portion 92 becomes higher than the concentration of the binder in the heat resistance layer formation composition (center portion composition 84*a*) applied to the substrate layer center portion 94, and the concentration of the binder contained in the region of the end portion composition 82*a*, which is relatively close to the substrate layer, becomes higher than the concentration of the binder contained in the surface region which includes the surface of the heat resistance layer formation composition and is relatively close to the surface. Accordingly, the heat resistance layer 80 in which, at the end portion (heat resistance layer end portion) 82 in the width direction DW perpendicular to the longitudinal direction DL of the heat resistance layer 80, the amount of the binder contained per unit volume in the region (that is, the substrate layer proximity region 86) which is relatively close to the substrate layer is higher than the amount of the binder contained per unit volume in the region (that is, the surface region 88) which is relatively close to the surface, can be formed.

Here, the length of the substrate layer end portion 92 in the width direction (that is, the length of the end portion composition 82*a* in the width direction) may be specified as a length corresponding to the length in the width direction of the end portion 72 (that is, the heat resistance layer end portion 82) in the width direction perpendicular to the longitudinal direction of the separator 70 (that is, the heat resistance layer 80) described above. That is, a region in the heat resistance layer formation composition 80*a* applied onto the substrate layer 90, which is locally heated during the heating process (S20), corresponds to the heat resistance layer (end portion heat resistance layer 82) positioned at the end portion 70*a* in the width direction DW perpendicular to the longitudinal direction DL of the separator 70. For example, the length in the width direction of the substrate layer end portion 92 is, for each end portion in the width direction, 1.5% or more (preferably 1.6% or more) of the total length in the width direction of the substrate layer 90, and may be specified to be in a range of 10% or less (preferably 8.4% or less) thereof.

Here, a heating temperature and a heating time for which the heat resistance layer formation composition (end portion composition) 82*a* on the substrate layer end portion 92 is heated are not particularly limited as long as it is realized that the amount of the binder contained per unit volume in the substrate layer proximity region 86 at the end portion (heat resistance layer end portion) 82 in the width direction DW of the heat resistance layer 80 is higher than the amount of the binder contained per unit volume in the surface region 88. For example, it is preferable that the heating temperature is set to allow the heat resistance layer formation composition in the region of the end portion composition 82*a*, which is close to the substrate layer, to be 70° C. or higher (more preferably 80° C. or higher, even more preferably 90° C. or higher, and even more preferably 110° C. or higher). As the heating temperature is set to be higher, the movement (migration) of the binder along the convection caused by the temperature difference can be accelerated. On the other hand, when the heating temperature is too high, the substrate layer 90 softens or melts, the pores of the substrate layer 90 are crushed, and thus there is concern that penetration of the non-aqueous electrolyte is not easily performed (that is, the conducting path of the charge carriers is blocked), which is not preferable. Therefore, it is preferable that the heating temperature is set so as to allow the temperature of the substrate layer 90 during the heating to be a temperature (for example, 140° C. or less, and preferably 130° C.) lower than the softening point of the substrate layer 90. In addition, the heating time may be, for example, tens of seconds or longer (typically 40 seconds or longer) and several minutes or shorter (typically 5 minutes or shorter, and preferably 3 minutes or shorter). Generally, the heating may be performed about 1 minute. Typically, by extending the heating time, the movement of the binder caused by the temperature difference in the heat resistance layer formation composition 80*a* can be accelerated.

A method of heating the end portion composition 82*a* is not particularly limited as long as it is a method of locally heating a heating region of the heat resistance layer formation composition. For example, as illustrated in FIG. 4, the heating may be performed using a heater (typically a bar-shaped or band-shaped heater) 200. Specifically, the heater 200 may be disposed to face a surface of the substrate layer end portion 92, to which the heat resistance layer formation composition is not applied, so as to perform heating. The heater 200 may be a far-infrared heater, and for example, a heater formed of a ceramic material.

In the manufacturing method of the separator of this embodiment, simultaneously with locally heating the end portion composition 82a, or after the local heating, drying and removing the solvent remaining in the heat resistance layer formation composition 80a may be further performed. The drying may be performed according to well-known separator drying methods (for example, drying with heat or drying under reduced pressure). For example, hot air drying in which hot air at a predetermined temperature is blown toward the heat resistance layer formation composition 80a so as to be dried may be performed.

In a case where the drying is performed simultaneously with the local heating of the end portion composition 82a, the drying is performed at a temperature lower than the heating temperature of the end portion composition 82a. In addition, even in a case where the drying is performed after performing the local heating of the end portion composition 82a, it is preferable that the drying is performed at a temperature lower than the heating temperature of the end portion composition 82a. When the temperature at which the drying is performed is too high, there is concern that the binder in the heat resistance layer formation composition 80a may move, that is, migrate. The drying temperature is preferably a temperature lower than, for example, 70° C., and more preferably 60° C. or lower. On the other hand, from the viewpoint of an efficiency of removing the solvent in the heat resistance layer formation composition 80a, it is preferable that the drying is performed at a temperature of, for example, 40° C. or higher, and typically 50° C. or higher. In addition, the drying may be performed on any one of or both of the heat resistance layer formation composition 80a side and the substrate layer 90 side of the separator 70. In general, the heat resistance layer 80 has more pores than the substrate layer 90. Therefore, the solvent in the heat resistance layer formation composition 80a can be efficiently removed by performing the drying at least from the heat resistance layer formation composition 80a side.

Hereinafter, a non-aqueous electrolyte secondary battery according to a preferred embodiment of the invention will be described by being exemplified by a lithium-ion secondary battery with reference to the appropriate drawings, and the invention is not intended to be limited by the embodiment. The shape (external form or size) of the non-aqueous electrolyte secondary battery is not particularly limited. In the following embodiment, a non-aqueous electrolyte secondary battery (lithium-ion secondary battery) having a configuration in which a wound electrode body and an electrolyte are accommodated in a square battery case will be described as an example. The lithium-ion secondary battery is an example, and the technical spirit of the invention is also applied to other non-aqueous electrolyte secondary batteries (for example, magnesium secondary batteries) provided with different charge carriers (for example, magnesium ions).

The lithium-ion secondary battery of this embodiment may have the same configuration as that in the related art except that the separator of this embodiment described above, that is, the separator having the heat resistance layer of this embodiment is provided. As the separator, the above-described separator may be used.

Figure 5:
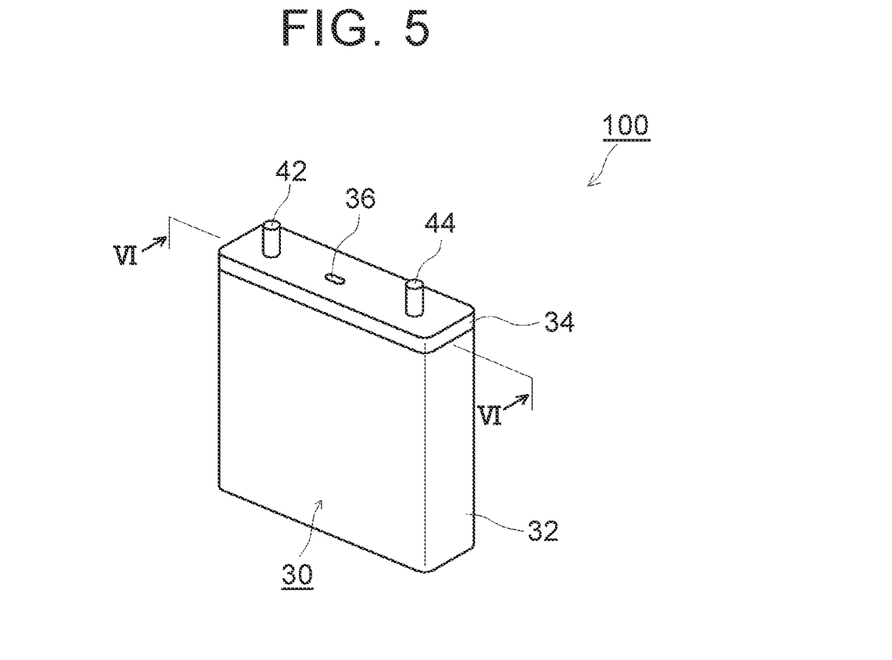
FIG. 5 is a perspective view schematically illustrating the external form of a non-aqueous electrolyte secondary battery according to the embodiment of the invention.
Figure 6:
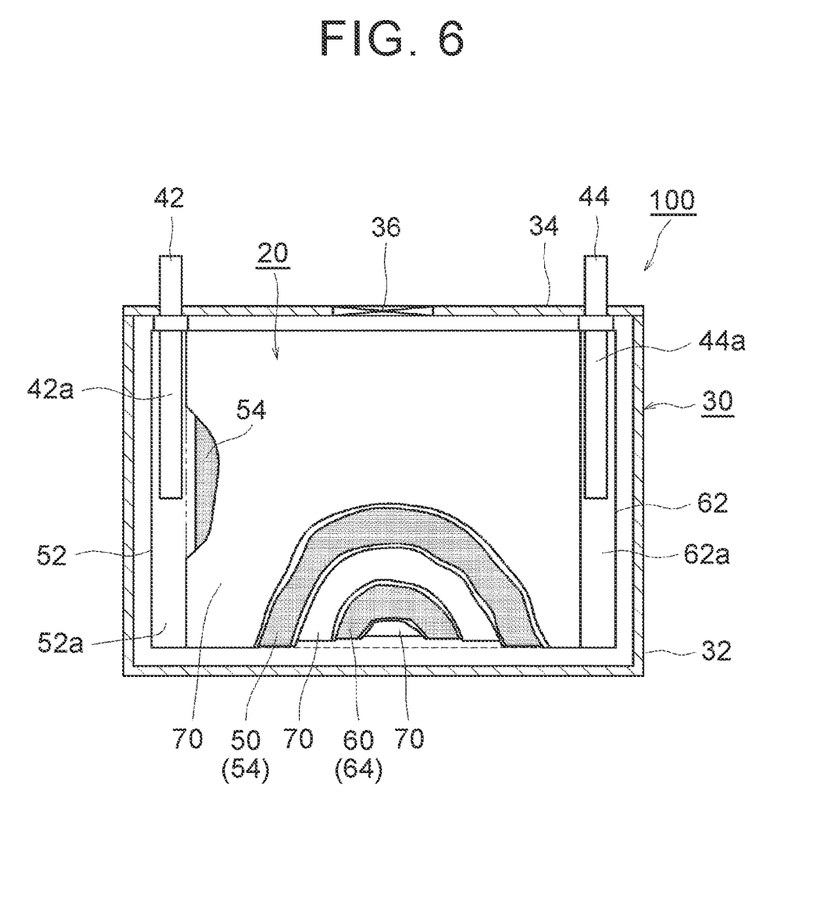
FIG. 6 is a longitudinal sectional view schematically illustrating a sectional structure taken along line VI-VI of FIG. 5.

As illustrated in FIGS. 5 and 6, a lithium-ion secondary battery 100 of this embodiment is a battery in which a wound electrode body 20 having a flat shape and a non-aqueous electrolyte (not illustrated) are accommodated in a battery case (that is, external container) 30. The battery case 30 is constituted by a case body 32 having a box shape (that is, a rectangular parallelepiped shape with a bottom) having an open end (corresponding to an upper end portion in a typical use state of the battery), and a cover 34 for sealing the opening of the case body 32. As the material of the battery case 30, a metal material (for example, aluminum) which is lightweight and has good thermal conductivity is preferably used. As illustrated in FIGS. 5 and 6, the cover 34 is provided with a positive electrode terminal 42 and a negative electrode terminal 44 for external connection. In addition, the cover 34 is provided with a safety valve 36 which is set to release an internal pressure in a case where the internal pressure of the battery case 30 increases to a predetermined level or higher, and an injection port (not illustrated) through which the non-aqueous electrolyte (typically non-aqueous electrolytic solution) is injected into the battery case 30.

Figure 7:
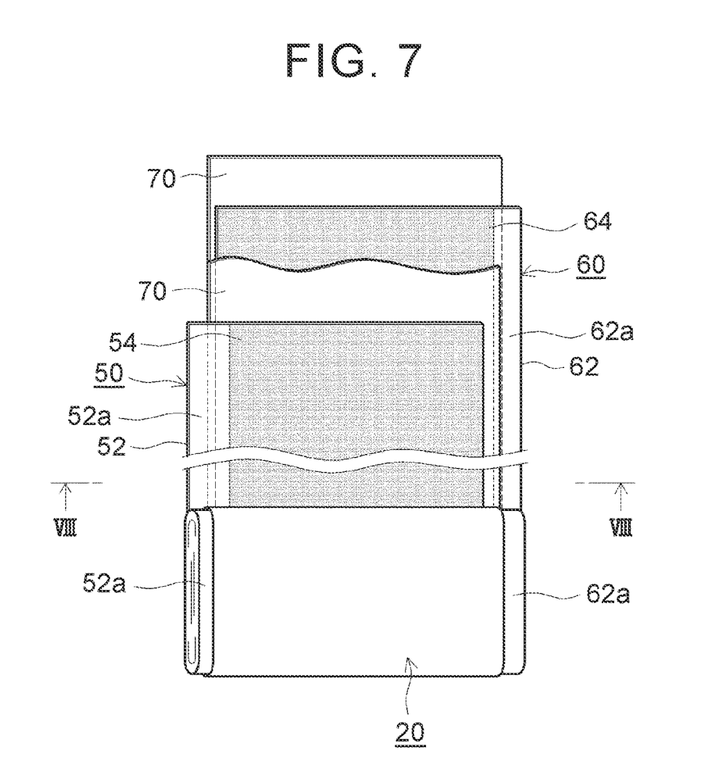
FIG. 7 is a schematic view illustrating the configuration of a wound electrode body according to the embodiment.
Figure 8:
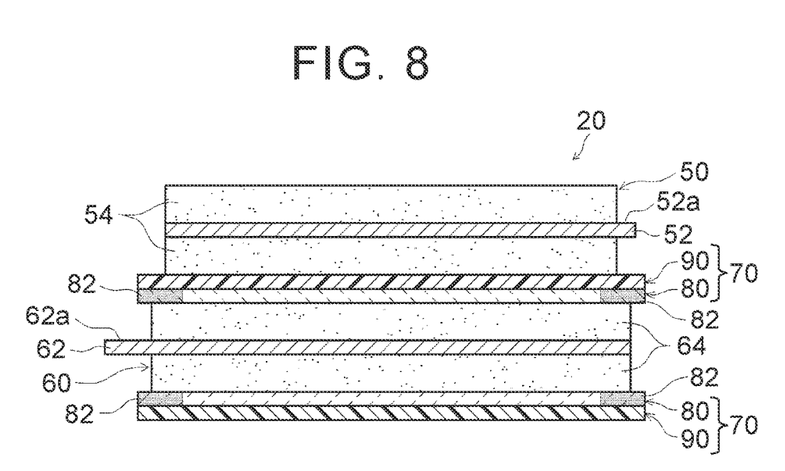
FIG. 8 is a longitudinal sectional view schematically illustrating a sectional structure taken along line VIII-VIII of FIG. 7, and is a partial sectional enlarged view schematically illustrating a portion between positive and negative electrodes of the wound electrode body according to the embodiment.

As illustrated in FIGS. 6 to 8, in the wound electrode body 20, a positive electrode sheet 50, in which a positive electrode active material layer 54 is formed on one surface or both surfaces (here, both surfaces) of a long positive electrode current collector 52 along a longitudinal direction thereof, and a negative electrode 60 (a negative electrode sheet), in which a negative electrode active material layer 64 is formed on one surface or both surfaces (here, both surfaces) of a long negative electrode current collector 62 along a longitudinal direction thereof, are laminated (overlapped) with two long separators 70 (the separator sheets) interposed therebetween, and are wound in the longitudinal direction. The wound electrode body 20 having a flat shape can be formed, for example, by laminating the positive electrode 50, the negative electrode 60, and the separators 70, winding the laminate, and pressing the wound body in a direction (typically in a direction from a side surface) perpendicular to the winding axis so as to be crushed.

Here, the lamination direction (a facing direction of the heat resistance layer 80 of the separator 70) of the separator 70 is not particularly limited. The heat resistance layer 80 formed on one surface of the separator 70 may face any of the negative electrode active material layer 64 and the positive electrode active material layer 54. In this embodiment, as illustrated in FIG. 8, the heat resistance layer 80 faces the negative electrode active material layer 64. By laminating the separators 70 and the positive and negative electrodes 50, 60 so as to allow the heat resistance layer 80 to face the negative electrode active material layer 64, for example, in a case where the negative electrode active material layer 64 (the negative electrode 60) generates heat due to overcharging or the like, the substrate layer 90 of the separator can be protected on the generated heat. On the other hand, by laminating the separators 70 and the positive and negative electrodes 50, 60 so as to allow the heat resistance layer 80 to face the positive electrode active material layer 54, direct contact between the positive electrode 50 and the substrate layer 90 of the separator 70 is prevented, and thus the oxidation of the separator substrate 90 due to the positive electrode 50 can be prevented.

Although not particularly limited, as illustrated in FIGS. 6 to 8, the wound electrode body 20 may be overlapped and wound so that a positive electrode active material layer non-formation portion 52a (that is, a portion in which the positive electrode active material layer 54 is not formed and the positive electrode current collector 52 is exposed) and a negative electrode active material layer non-formation portion 62a (that is, a portion in which the negative electrode active material layer 64 is not formed and the negative electrode current collector 62 is exposed) protrude outward from both ends in the winding axis direction. As a result, in the center portion in the winding axis direction of the wound electrode body 20, a wound core in which the positive electrode 50 (the positive electrode sheet), the negative electrode 60 (the negative electrode sheet), and the separator 70 (the separator sheet) are laminated and wound is formed. In addition, as illustrated in FIG. 6, in the positive electrode 50 and the negative electrode 60, the positive electrode active material layer non-formation portion 52a and the positive electrode terminal 42 (for example, made of aluminum) may be electrically connected via a positive electrode current collector plate 42a, and the negative electrode active material layer non-formation portion 62a and the negative electrode terminal 44 (for example, made of nickel) may be electrically connected via a negative electrode current collector plate 44a. The positive and negative electrode current collector plates 42a, 44a and the positive and negative electrode active material layer non-formation portions 52a, 62a (typically the positive and negative electrode current collectors 52, 62) may be joined to each other by, for example, ultrasonic welding or resistance welding.

In the separator 70, the amount of the binder contained per unit volume in the heat resistance layer 80 (that is, the heat resistance layer end portion 82) positioned at the end portion 70a in the width direction DW perpendicular to the longitudinal direction DL of the separator 70 is higher than the amount of the binder contained per unit volume in the heat resistance layer 80 (that is, the heat resistance layer center portion 84) positioned at the center portion 70b in the width direction DW of the separator 70. Particularly in the heat resistance layer end portion 82, the mount of the binder contained per unit volume in the region (that is, the substrate layer proximity region 86) which is relatively close to the substrate layer 90 is high. The portion with a high amount of the binder tends to allow lithium ions to be less likely to move (diffuse). Therefore, from the viewpoint of reducing an increase in battery resistance, it is preferable that a portion in which the positive electrode active material layer 54 and the negative electrode active material layer 64 are laminated (face each other) overlaps the heat resistance layer end portion 82 (that is, the end portion 70a of the separator) as little as possible, and it is more preferable that the portion in which the positive electrode active material layer 54 and the negative electrode active material layer 64 are laminated (face each other) does not overlap the heat resistance layer end portion 82 (that is, the end portion 70a of the separator).

Here, as the positive electrode 50 and the negative electrode 60, those that are used in a non-aqueous electrolyte secondary battery (lithium-ion secondary battery) of the related art may be used without limitations. A typical type is described below.

The positive electrode 50 of the lithium-ion secondary battery includes the positive electrode current collector 52 and the positive electrode active material layer 54 formed on the positive electrode current collector 52. As the positive electrode current collector 52, a conductive material made of a metal with good conductivity (for example, aluminum, nickel, titanium, stainless steel, or the like) may be appropriately employed. The positive electrode active material layer 54 contains at least a positive electrode active material. As the positive electrode active material, for example, lithium complex metal oxides having a layered structure or a spinel structure (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and $LiFePO_4$) may be appropriately used. In addition, the positive electrode active material layer 54 may contain components other than the active material, for example, a conductive material and a binder. As the conductive material, a carbon material such as carbon black including acetylene black (AB) and other materials (graphite or the like) may be appropriately used. As the binder, PVdF or the like may be used.

For example, the positive electrode 50 may be manufactured as follows. The positive electrode 50 can be formed by first dispersing materials which are used as necessary for the positive electrode active material in an appropriate solvent (for example, N-methyl-2-pyrrolidone) to prepare a paste-like (slurry-like) composition, thereafter applying an appropriate amount of the composition to the surface of the positive electrode current collector 52, and then removing the solvent through drying. In addition, an appropriate pressing process may be performed as necessary to adjust the properties of the positive electrode active material layer 54 (for example, average thickness, active material density, porosity, and the like).

The negative electrode 60 of the lithium-ion secondary battery includes the negative electrode current collector 62 and the negative electrode active material layer 64 formed on the negative electrode current collector 62. As the negative electrode current collector 62, a conductive material made of a metal with good conductivity (for example, copper, nickel, titanium, stainless steel, or the like) may be appropriately employed. The negative electrode active material layer 64 contains at least a negative electrode active material. As the negative electrode active material, for example, a carbon material containing a graphite structure (layered structure) at least in a portion, such as graphite, non-graphitizable carbon (hard carbon), graphitizable carbon (soft carbon), carbon nanotubes, or a material having a combined structure thereof may be appropriately used. Among the materials, natural graphite (graphite) or synthetic graphite may be preferably used because high energy density is obtained. In addition, the negative electrode active material layer 64 may contain components other than the active material, for example, a binder and a thickener. As the binder, various polymer materials such as styrene-butadiene rubber (SBR) may be used. As the thickener, various polymer materials such as carboxymethyl cellulose (CMC) may be used.

For example, the negative electrode 60 may be manufactured as in the case of the positive electrode described above. That is, the negative electrode 60 can be formed by first dispersing materials which are used as necessary for the negative electrode active material in an appropriate solvent (for example, ion-exchange water) to prepare a paste-like (slurry-like) composition, thereafter applying an appropriate amount of the composition to the surface of the negative electrode current collector 62, and then removing the solvent through drying. In addition, an appropriate pressing process may be performed as necessary to adjust the properties of the negative electrode active material layer 64 (for example, average thickness, active material density, porosity, and the like).

As the non-aqueous electrolyte of this embodiment, typically, an appropriate non-aqueous solvent (typically organic solvent) containing a support salt may be used. For example, a non-aqueous electrolyte in a liquid state at room temperature (that is, non-aqueous electrolytic solution) is preferably used.

As the non-aqueous solvent, various types of organic solvents that are used for a general non-aqueous electrolyte secondary battery may be used without particular limitations. For example, aprotic solvents such as carbonates, ethers, esters, nitriles, sulfones, and lactones may be used without particular limitations. Among the materials, carbonates such as ethylene carbonate (EC), diethyl carbonate (DEC), dimethyl carbonate (DMC), ethyl methyl carbonate (EMC), and propylene carbonate (PC) may be appropriately employed.

As the support salt, for example, lithium salts such as $LiPF_6$, $LiClO_4$, $LiAsF_6$, $Li(CF_3SO_2)_2N$, $LiBF_4$, and $LiCF_3SO_3$ may be appropriately employed. Only one type of the support salts, or a combination of two or more types thereof may be used. Particularly, $LiPF_6$ is preferable. The concentration of the support salt is not particularly limited, and may be approximately 1.1 mol/L.

The separator of this embodiment is a separator with suppressed thermal shrinkage in an environment at a high temperature. In addition, a battery which employs the separator is a battery in which internal short-circuits caused by the shrinkage of the separator are suppressed and thus the battery performance is excellent (for example, the battery resistance is low). Therefore, the non-aqueous electrolyte secondary battery of this embodiment with its characteristics may be appropriately used as a drive power source mounted in a vehicle such as plug-in hybrid vehicle (PHV), a hybrid vehicle (HV), and an electric vehicle (EV). In addition, according to the invention, a vehicle which is provided with the non-aqueous electrolyte secondary battery of this embodiment preferably as a power source (typically, an assembled battery in which a plurality of secondary batteries are electrically connected to each other) is provided.

Hereinafter, Examples of the invention will be described, and the invention is not intended to be limited by Examples.

Separators (that is, separators according to Examples 1 to 12) used for the configuration of lithium-ion secondary batteries (non-aqueous electrolyte secondary batteries) according to Examples 1 to 12 shown in Table 1 were produced in the following process using the following materials.

First, as a separator substrate (substrate layer), a long, fine porous polyethylene (PE) film (in which the length in a width direction DW perpendicular to a longitudinal direction was 120 mm) having an average thickness of 25 μm was prepared. In addition, alumina having an average particle size ($D_{50}$) of 2 μm was inorganic filler, and acrylic resin having an average particle size of approximately 300 nm as a binder were prepared.

Example 1

The separator according to Example 1 was produced as follows. First, alumina as the inorganic filler and the acrylic resin as the binder were mixed with ion-exchange water at a mass ratio of inorganic filler:binder=96:4, thereby preparing a slurry-like (paste-like) heat resistance layer formation composition. The concentration (in terms of NV, that is, in terms of solid content) of the binder contained in the total solid content of the heat resistance layer formation composition is shown in the row of "binder concentration (mass %)" of Table 1. Thereafter, the heat resistance layer formation composition was applied to only one surface of the separator substrate. Here, the application of the heat resistance layer formation composition was performed using a gravure coater so that the heat resistance layer formation composition was applied to the entire surface of the separator substrate (one surface). Next, the heat resistance layer formation composition applied to both end portions (a region with a width of 2 mm from the edge portion of each end portion) in the width direction perpendicular to the longitudinal direction of the separator substrate was heated from the substrate layer side (that is, a surface of the substrate layer, to which the heat resistance layer formation composition was not applied) under a temperature condition of 90° C. for 1 minute. A heater was used during the heating. In addition, regarding the lengths in the width direction of both of the end portions, the length of one end portion in the width direction is shown in the row of "end portion width (mm)" in Table 1, and the ratio of the length of one end portion in the width direction to the overall length in the width direction perpendicular to the longitudinal direction of the separator is shown in the row of "end portion width (%)". In addition, the heating temperature of the heat resistance layer formation composition at both of the end portions is shown in the row of "end portion heating temperature (° C.)" in Table 1. Thereafter, the entire surface of the heat resistance layer formation composition applied onto the substrate layer was heated from the heat resistance layer side (that is, a surface side of the separator, to which the heat resistance layer formation composition is applied) under a temperature condition of 50° C. for 1 minute to remove the solvent (here, the ion-exchange water) in the heat resistance layer formation composition. As the heating (drying), hot air drying in which hot air at 50° C. was blown toward the surface of the heat resistance layer formation composition was performed. According to the foregoing process and materials, the separator according to Example 1 in which the heat resistance layer was provided on one surface of the substrate layer was produced.

Examples 2, 3, 7, 8, and 9

Separators according to Examples 2, 3, 7, 8, and 9 were produced according to the same process and materials as those of Example 1 except that both of the end portions (both end portions in the width direction perpendicular to the longitudinal direction of the separator) had regions with widths of 5 mm, 10 mm, 1 mm, 11 mm, and 15 mm from the edge portion of each end portion.

Examples 4, 5, 10, and 11

Separators according to Examples 4, 5, 10, and 11 were produced according to the same process and materials as those of Example 2 except that the heating temperatures when both end portions in the width direction of the separators were heated from the separator substrate layer side were 80° C., 110° C., 50° C., and 70° C.

Example 6

A separator according to Example 6 was produced according to the same process and materials as those of Example 1 except that the heat resistance layer formation composition applied to both end portions in the width direction of the substrate layer was not locally heated (that is, both end portions were regions with a width of 0 mm from the edge portions).

Example 12

A separator according to Example 12 was produced according to the same process and materials as those of Example 6 except that the mass ratio between the inorganic filler and the binder in the heat resistance layer formation composition was inorganic filler:binder=90:10.

The average particle size ($D_{50}$) of the inorganic filler used for the manufacturing of the separators according to Examples 1 to 12 described above was measured by a laser diffraction particle size analyzer (Microtrac HRA, manufactured by Nikkiso Co., Ltd.). In addition, during the preparation of the heat resistance layer formation compositions according to Examples 1 to 12, mixing and kneading were performed by using an ultrasonic disperser (CLEARMIX manufactured by M Technique Co., Ltd.) under the condition in which preliminary dispersion was performed at 15000 rpm for 5 minutes and main dispersion was performed at 20000 rpm for 15 minutes.

The distribution of the binder of the heat resistance layer of the separator according to each of Examples was inspected through SEM-EDX analysis after the acrylic binder in the heat resistance layer was dyed with bromine (Br). As a result, it was confirmed that, in the separators according to Examples 1 to 5, 7 to 9, and 11, the amount of the binder contained per unit volume in the heat resistance layer at both end portions (that is, the portions heated from the substrate layer side) in the width direction perpendicular to the longitudinal direction of the separator was higher than the amount of the binder contained per unit volume in the heat resistance layer at the center portion (that is, the portions that were not heated from the substrate layer side) of the separator. In addition, it was confirmed that, in the separators according to Examples 1 to 5, 7 to 9, and 11, the amount of the binder contained per unit volume in the region of the heat resistance layer of the end portion, which is close to the substrate layer, is higher than the amount of the binder contained per unit volume in the surface region that includes the surface. It is thought that this is because a temperature difference had occurred in the heat resistance layer formation composition applied onto the substrate layer due to the local heating of the heat resistance layer formation composition, which is positioned at the end portion in the width direction perpendicular to the longitudinal direction of the substrate layer, from the substrate layer side, and the binder had moved (migrated) due to the temperature difference. On the other hand, in the separators according to Examples 6, 10, and 12, an increase in the amount of the binder contained in the heat resistance layer positioned at the end portion in the width direction of the separator and an increase in the amount of the binder contained in the region of the heat resistance layer of the end portion, which is close to the substrate layer, were not confirmed. It is thought that this is because the end portion in the width direction of the separator was insufficiently heated from the substrate layer side or the heating was not performed and thus the binder did not move in the heat resistance layer formation composition.

TABLE 1

| Example | End portion width (mm) | End portion width (%) | End portion heating temperature (° C.) | Binder concentration (wt %) | End portion peel strength (N/m) | Thermal shrinkage (%) | Battery resistance (mΩ) |
|---|---|---|---|---|---|---|---|
| 1 | 2 | 1.7 | 90 | 4 | 30 | 4 | 3 |
| 2 | 5 | 4.2 | 90 | 4 | 30 | 2 | 3.1 |
| 3 | 10 | 8.3 | 90 | 4 | 30 | 1 | 3.2 |
| 4 | 5 | 4.2 | 80 | 4 | 20 | 3 | 3.1 |
| 5 | 5 | 4.2 | 110 | 4 | 50 | 1 | 3.1 |
| 6 | 0 | 0 | — | 4 | 10 | 30 | 3 |
| 7 | 1 | 0.8 | 90 | 4 | 30 | 13 | 3 |
| 8 | 11 | 9.2 | 90 | 4 | 30 | 1 | 3.5 |
| 9 | 15 | 12.5 | 90 | 4 | 30 | 1 | 5 |
| 10 | 5 | 4.2 | 50 | 4 | 10 | 30 | 3.1 |
| 11 | 5 | 4.2 | 70 | 4 | 15 | 19 | 3.1 |
| 12 | 0 | 0 | — | 10 | 30 | 1 | 7 |

[Measurement of 90° Peel Strength]

Regarding the separator according to each of Examples produced as described above, the peel strength between the substrate layer and the heat resistance layer at the end portion in the width direction perpendicular to the longitudinal direction of the separator was evaluated by performing a 90° peel test using a tensile tester. The 90° peel test was performed according to JIS C 6481 (1996). As the tensile tester, TG-2 kN manufactured by Minebea Co., Ltd. was used. Specifically, evaluation was performed as follows. First, a rectangular test piece of 120 mm×2 mm was cut from a portion of 2 mm from the edge (here, right end) in the width direction of each of the separators such that the longitudinal direction of the separator was coincident with the longitudinal direction of the test piece. In order to fix the separator substrate (substrate layer) of one end portion in a long side direction of the test piece to a tension jig (for example, clamp), the heat resistance layer of one end portion in the long side direction of the test piece was peeled off from the separator substrate (substrate layer). In addition, the heat resistance layer surface of the test piece was attached the fixture of the tensile tester using a double-sided tape to fix the test piece (separator) onto the fixture of the tensile tester. The peeled portion (the substrate layer) of the heat resistance layer of the test piece was fixed to the tension jig. In addition, the tension jig was pulled (that is, the substrate layer was pulled) upward in the vertical direction (at a peel angle of 90±5°) with respect to the surface of the fixture (that is, the heat resistance layer attached to the fixture) at a speed of 0.5 mm per second to peel the heat resistance layer and the substrate layer from each other. At this time, the average of loads while the substrate layer is peeled off from the heat resistance layer was measured, and the average of loads per unit width (here, a width of 1 m) was referred to as peel strength (N/m). The results are shown in the row of "peel strength (N/m)" of Table 1.

[Measurement of Thermal Shrinkage Ratio]

Regarding the separator according to each of Examples produced as described above, a thermal shrinkage ratio (%) in the width direction in an environment at a temperature of 180° C. was measured. First, a rectangular evaluation test piece having a size, in which the short side is directed along the width direction perpendicular to the longitudinal direction of the separator sheet and the width of the separator is the same as the length (La) in the short side direction, was cut from the separator according to each of Examples. In addition, both short side portions (that is, both ends in the long side direction) of the evaluation test piece were fixed onto a plate-like member (here, glass plate) such that tension was not applied to the evaluation test piece in any direction. Here, the fixing of the evaluation test piece was performed using a heat-resistant tape (here, Kapton tape) such that portions that were not fixed and positioned between both short side portions that were fixed form a square shape. After the evaluation test piece that was fixed was held in a thermostatic bath at 180° C. for approximately 2 hours, the test piece was left in the air to reach room temperature. In the length in the short side direction of the evaluation test piece (the measurement portion of the square shape) that was left in the air, that is, the length of the separator corresponding to the width direction, the length (Lb) of the shortest portion was measured, and thermal shrinkage ratio (%) was calculated by the following expression.

Thermal shrinkage ratio (%)=$(La-Lb) \div La \times 100$(%)

The results are shown in the row of "thermal shrinkage ratio (%)" of Table 1.

As shown in Table 1, in the separators according to Examples 1 to 5, 7 to 9, and 11 in which the amount of the binder in the heat resistance layer at the end portion in the width direction of the separator was higher than the amount of the binder in the heat resistance layer at the center portion in the width direction of the separator and the amount of the binder in the region of the heat resistance layer at the end portion, which is close to the substrate layer, was higher than the amount of the binder in the surface region which included the surface, it was confirmed that the peel strength between the substrate layer and the heat resistance layer at the end portion in the width direction was high compared to the separator according to Example 6. Particularly, from the comparison between Examples 2, 4, 5, 10, and 11, it was confirmed that the peel strength of the end portion could be increased as the heat resistance layer formation composition applied to the end portion in the width direction of the substrate layer was heated at a higher temperature. In addition, compared to the separator according to Example 6, in the separator according to Example 12, the amount of the binder contained in the heat resistance layer formation composition was increased, and thus the peel strength of the entire heat resistance layer on the substrate layer was high.

Furthermore, as shown in Table 1, in the separators according to Examples 1 to 5, 7 to 9, and 11, compared to the separator of Example 6, the thermal shrinkage ratio was low. From this, it was confirmed that thermal shrinkage of the separator could be suppressed by increasing the peel strength of the end portion in the width direction of the separator on the substrate layer. In the separator according to Example 12, the peel strength of the entire heat resistance layer on the substrate layer was high, and thus the thermal shrinkage of the separator was reduced. From the comparison between the separator according to Example 1 and the separator according to Example 7, it was confirmed that the thermal shrinkage of the separator could be appropriately suppressed by allowing the length in the width direction of the end portion in the width direction perpendicular to the longitudinal direction of the separator (the substrate layer and the heat resistance layer) to be 2 mm or larger. In addition, from the comparison between the separator according to Example 4 and the separator according to Example 11, it was confirmed that the thermal shrinkage of the separator could be appropriately suppressed by allowing the peel strength of the heat resistance layer on the substrate layer at the end portion in the width direction of the separator to be 20 N/m or higher.

[Construction of Non-Aqueous Electrolyte Secondary Battery]

Next, lithium-ion secondary batteries (non-aqueous electrolyte secondary batteries) according to Examples 1 to 12 were constructed according to the following materials and processes.

A positive electrode was produced in the following procedure. $LiNi_{0.33}Co_{0.33}Mn_{0.33}O_2$ (LNCM) as positive electrode active material powder, AB as a conductive material, and PVdF as a binder were mixed with NMP at a mass ratio of LNCM:AB:PVdF=90:8:2, thereby preparing a slurry-like positive electrode active material layer formation composition. The composition was applied to both surfaces of a long aluminum foil (positive electrode current collector) having an average thickness of 20 μm. At this time, the composition was uniformly applied so that a surface to which the positive electrode active material layer formation composition was applied had a band shape in which the length in the width direction facing the longitudinal direction was 110 mm while allowing a band-shaped positive electrode active material layer non-formation portion to remain along one end in the width direction of the positive electrode current collector. The coating weight (applied amount) of the positive electrode active material layer formation composition was set to allow the mass (coating amount) of the positive electrode active material layer formed per unit area in the positive electrode current collector to become 15 mg/cm$^2$ as the sum of the mass (the mass of the positive electrode active material layer in a dry state) of the positive electrode active material layer formed on both surfaces of the positive electrode current collector. In addition, the positive electrode current collector to which the positive electrode active material layer formation composition was applied as described above was dried and pressed, thereby producing the positive electrode having the positive electrode active material layer on the positive electrode current collector.

A negative electrode was produced in the following procedure. Graphite (C) as a negative electrode active material, styrene-butadiene rubber (SBR) as a binder, and CMC as a thickener were mixed with ion-exchange water at a mass ratio of C:SBR:CMC=98:1:1, thereby preparing a slurry-like negative electrode active material layer formation composition. The composition was applied to both surfaces of a long copper foil (negative electrode current collector) having an average thickness of 10 μm. At this time, the composition was uniformly applied so that a surface to which the negative electrode active material layer formation composition was applied had a band shape in which the length in the width direction facing the longitudinal direction was 115 mm while allowing a band-shaped negative electrode active material layer non-formation portion to remain along one end in the width direction of the negative electrode current collector. The coating weight (applied amount) of the negative electrode active material layer formation composition was set to allow the mass (coating amount) of the negative electrode active material layer formed per unit area in the negative electrode current collector to become 15 mg/cm$^2$ as the sum of the mass (the mass of the negative electrode active material layer in a dry state) of the negative electrode active material layer formed on both surfaces of the negative electrode current collector. In addition, the negative electrode current collector to which the negative electrode active material layer formation composition was applied as described above was dried and pressed, thereby producing the negative electrode having the negative electrode active material layer on the negative electrode current collector.

Wound electrode bodies according to Examples 1 to 12 were produced by using one sheet of the positive electrode and one sheet of the negative electrode produced as above and two sheets of the separators (the separators according to Examples 1 to 12) produced as described above. First, the positive and negative electrodes were overlapped to face each other in the longitudinal direction with the separators according to each of Examples interposed therebetween. At this time, both the two sheets of the separators were laminated in a direction in which the heat resistance layer faced the negative electrode (negative electrode active material layer). In addition, the positive electrode and the negative electrode were overlapped to face each other while being shifted from each other such that a portion of the positive electrode active material layer non-formation portion provided in the positive electrode and a portion of the negative electrode active material layer non-formation portion provided in the negative electrode protrude in different directions in the width direction (a winding axis direction of the wound electrode body). The positive electrode, the negative electrode, and the separators which were laminated were rolled (wound) in the longitudinal direction and thereafter were pressed and crushed, thereby producing the wound electrode body having a flat shape. The electrode bodies were constructed by using a combination between the separators according to Examples (that is, two sheets of the separators according to Example 1 for the construction of the electrode body according to Example 1).

As a non-aqueous electrolyte, an electrolyte (that is, non-aqueous electrolytic solution) in which $LiPF_6$ as a support salt was dissolved at a concentration of 1 mol/L in a solvent mixture containing EC, EMC, and DMC at a volume ratio of EC:EMC:DMC=3:5:2 was prepared. In addition, as an external body (battery case) which accommodates the electrode body and the non-aqueous electrolytic solution, a body including a thin square-shaped battery case body which is made of aluminum with a wall thickness of 1 mm and has an open end (upper end in a typical use state) and a cover that seals the opening of the battery case body was prepared. The size of the battery case body was 75 mm in height×150 mm in width×15 mm in thickness when the opening was positioned on the upper side.

Next, the wound electrode body according to each of Examples was accommodated in the square battery container (square battery case) made of aluminum, the non-aqueous electrolytic solution was injected through the opening of the battery case, the opening was air-tightly sealed, thereby producing a lithium-ion secondary battery (non-aqueous electrolyte secondary battery) according to each of Examples (Examples 1 to 12) having a theoretical capacity of 5 Ah.

[Charging Process (Conditioning Process)]

A charging process (initial charging) was performed on the battery according to each of Examples constructed as described above. Specifically, under a temperature condition of 25° C., constant-current charging (CC charging) was performed until the voltage between the positive and negative electrode terminals reached 4.2 V at a charging rate (current value) of 1 C (5 A), the battery was disconnected for 5 minutes, constant-current discharging (CC discharging) was performed until the voltage between the positive and negative electrode terminals reached 3.0 V at a discharging rate (current value) of 1 C (5 A), and the battery was disconnected for 5 minutes. Here, "1 C" refers to a current value that allows the battery capacity (Ah) estimated from a theoretical capacity to be charged during 1 hour. For example, 1 C=3.8 A is satisfied in a case where the battery capacity was 3.8 Ah.

[Measurement of Rated Capacity (Initial Capacity)]

Regarding the battery of each of Examples after the initial charging, a rated capacity (initial capacity) was measured in a voltage range of 3.0 V to 4.1 V at a temperature of 25° C. Specifically, first, under a temperature condition of 25° C., constant-current (CC) charging was performed until the battery voltage reached 4.1 V at a charging rate (current value) of 1 C, and thereafter constant-voltage (CV) charging was performed until the current value reached 0.01 C. Thereafter, constant-current (CC) discharging was performed until the battery voltage reached 3.0 V at a discharging rate (current value) of 1 C, and thereafter constant-voltage (CV) discharging was performed until the current value reached 0.01 C. The discharging capacity (CCCV discharging capacity) at this time was used as the initial capacity (Ah). It was confirmed that all of the batteries of Examples 1 to 12 obtained the theoretical capacity (5 Ah).

[Measurement of Initial Resistance (IV Resistance)]

Next, regarding the battery according to each of Examples after the initial capacity was measured, initial resistance (IV resistance) was measured. Specifically, first, each of the batteries after the initial capacity was measured was adjusted to a SOC60% charged state under a temperature condition of 25° C. In addition, at the same temperature, discharging and charging were alternately performed on each of the batteries for 10 seconds at each of current values of 5 C, 10 C, and 20 C, and a voltage after 10 seconds from the start of the discharging was measured. Current values (X-axis) and voltage values (Y-axis) at this time were plotted using a linear regression line, and the battery resistance (IV resistance) (mΩ) of each of the batteries was obtained from the slope. The results are shown in the row of "battery resistance" of Table 1. Here, "SOC" (state of charge) refers to a charged state when the initial capacity was SOC100%.

As illustrated in Table 1, in the battery constructed by using the separator according to Example 12 (that is, the battery according to Example 12) in which the peel strength of the heat resistance layer on the substrate layer was increased by increasing the amount of the binder contained in the entire heat resistance layer, the battery resistance was high. It is thought that this is because the penetration of the charge carriers (lithium ions) was degraded due to the increased amount of the binder in the heat resistance layer of the separator. From the comparison between the separators according to Examples 6 and 12 (the batteries using the separators) and the separators according to Examples 1 to 5, 7 to 9, and 11 (the batteries using the separators), it was confirmed that in the separator in which the amount of the binder contained per unit volume in the heat resistance layer positioned at the end portion in the width direction perpendicular to the longitudinal direction of the separator was higher than the amount of the binder contained per unit volume in the heat resistance layer positioned at the center portion including at least the center in the width direction of the separator, and the amount of the binder contained per unit volume in the region of the heat resistance layer of the end portion, which was relatively close to the substrate layer, was higher than the amount of the binder contained per unit volume in the surface region which included the surface of the heat resistance layer and was relatively close to the surface, thermal shrinkage was reduced, and the battery resistance of the battery using the separator could be reduced.

In addition, from the comparison between the battery resistances of the batteries constructed by using the separators according to Examples 1 to 3, 8, and 9, it was confirmed that the battery resistance of the battery constructed by using the separator could be appropriately reduced by allowing the length in the width direction of the end portion in the width direction of the separator to be 2 mm or larger and 11 mm or smaller (for example, 1.5 or more and 10% or less of the overall length in the width direction of the separator for each end portion in the width direction).

What is claimed is:

1. A manufacturing method of a separator for a non-aqueous electrolyte secondary battery, the separator having a flat shape and including a substrate layer made of a resin and a heat resistance layer formed on a surface of the substrate layer, the manufacturing method comprising processes of:

applying a heat resistance layer formation composition containing heat-resistant fine particles, a binder, and a solvent onto the substrate layer; and heating the heat resistance layer formation composition applied to an end portion in a width direction perpendicular to a longitudinal direction of the substrate layer in the heat resistance layer formation composition applied onto the substrate layer, from a substrate layer side, thereby forming the heat resistance layer, in which an amount of the binder contained per unit volume in a substrate layer side region is higher than the amount of the binder contained per unit volume in a surface side region which includes a surface of the heat resistance layer, at the end portion in the width direction of the heat resistance layer.

2. The manufacturing method according to claim 1, wherein
the end portion in the width direction of the heat resistance layer is heated at a temperature of 80° C. or higher.

3. The manufacturing method according to claim 1, wherein
a width of the end portion is 1.5% or more and 10% or less of a width of the substrate layer for each end portion in the width direction.

4. A separator for a non-aqueous electrolyte secondary battery, comprising:

a substrate layer made of a resin; and a heat resistance layer provided on one surface of the substrate layer, the separator having a flat shape, wherein the heat resistance layer contains heat-resistant fine particles and a binder, an amount of the binder contained per unit volume in the heat resistance layer positioned at an end portion in a width direction perpendicular to a longitudinal direction of the separator is higher than the amount of the binder contained per unit volume in the heat resistance layer positioned at a center portion which includes the center in the width direction of the separator, and in the heat resistance layer at the end portion, the amount of the binder contained per unit volume in a substrate layer side region is higher than the amount of the binder contained per unit volume in a surface side region which includes a surface of the heat resistance layer.

5. The separator according to claim 4, wherein
a peel strength between the substrate layer and the heat resistance layer at the end portion is 20 N/m or higher and 50 N/m or lower.

6. The separator according to claim 4, wherein
a width of the end portion is 1.5% or more and 10% or less of a width of the separator for each end portion in the width direction.

7. A non-aqueous electrolyte secondary battery comprising:

an electrode body which includes a positive electrode and a negative electrode laminated with the separator according to claim 4 interposed therebetween; and a non-aqueous electrolyte.

* * * * *